UNITED STATES PATENT OFFICE.

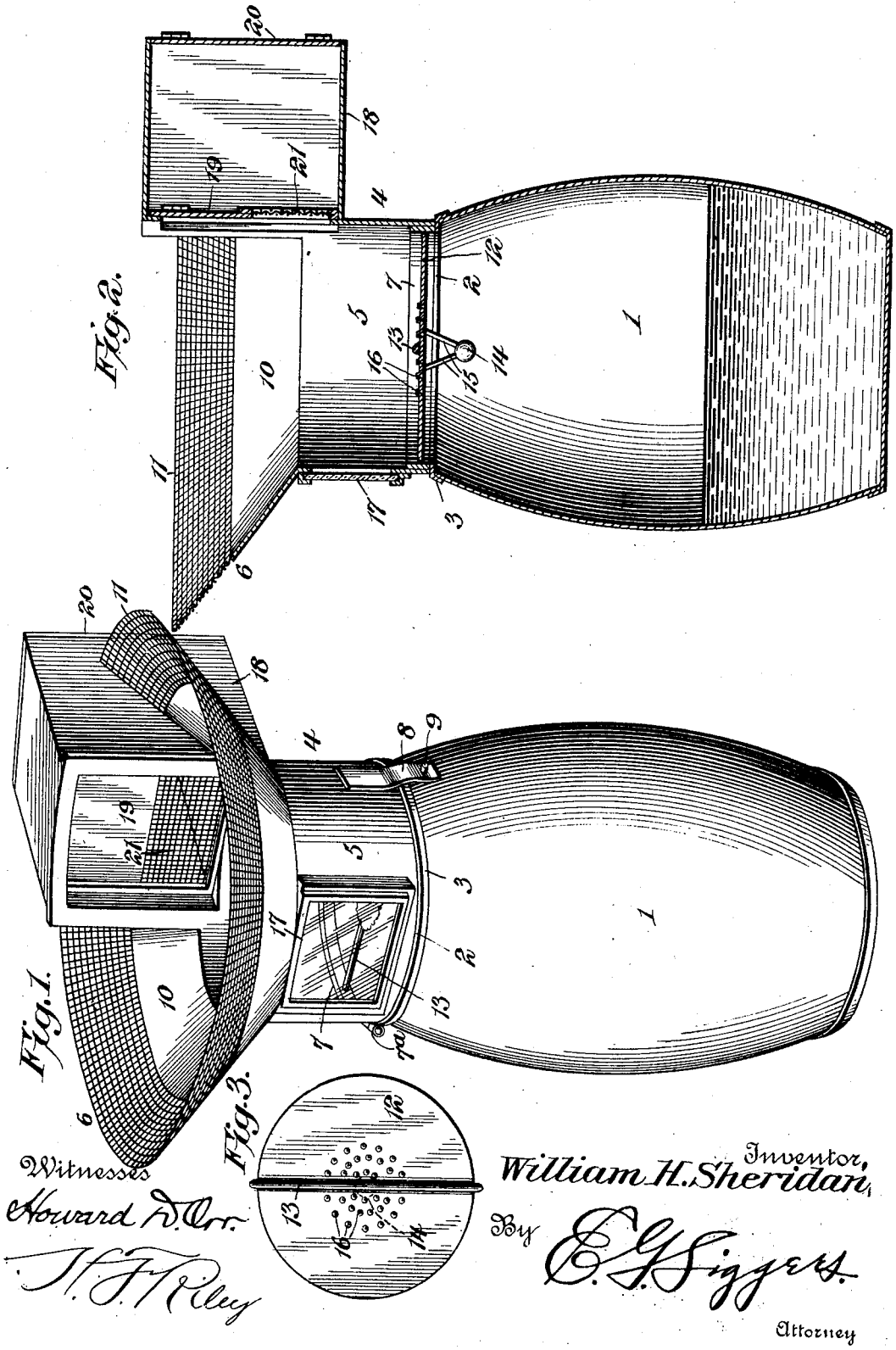

WILLIAM H. SHERIDAN, OF SADLER, TEXAS.

ANIMAL-TRAP.

No. 829,607.  Specification of Letters Patent.  Patented Aug. 28, 1906.

Application filed October 27, 1905. Serial No. 284,733.

*To all whom it may concern:*

Be it known that I, WILLIAM H. SHERIDAN, a citizen of the United States, residing at Sadler, in the county of Grayson and State of Texas, have invented a new and useful Animal-Trap, of which the following is a specification.

The invention relates to improvements in animal-traps.

The object of the present invention is to improve the construction of animal-traps and to provide a simple, inexpensive, and efficient one of great strength and durability of the self-setting and ever-set type adapted for capturing various kinds of animals and capable of effectually preventing the same from obtaining the bait, so that the trap will not require attention and will remain baited for a considerable length of time.

A further object of the invention is to provide a trap of this character which will effectually precipitate into it an animal attempting to obtain the bait and which will destroy the captured animals, so that they may be readily emptied from the trap.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

In the drawings, Figure 1 is a perspective view of an animal-trap constructed in accordance with this invention. Fig. 2 is a vertical sectional view of the same. Fig. 3 is a detail view of the rotary trap-door.

Like numerals of reference designate corresponding parts in all the figures of the drawings.

1 designates a substantially barrel-shaped receptacle forming the lower section of the trap and designed to be constructed of any suitable material, preferably sheet metal.
The sides of the receptacle 1 are bowed outward to present an upper inwardly-inclined surface for effectually preventing a captured animal from crawling upward, and thereby escaping from the trap. In order to destroy the captured animals, the receptacle is designed to be partially filled with water, and if filled to about one-third of its capacity there will be sufficient water to drown an entire trapful of animals.

The receptacle is provided at its upper edge with an inwardly-extending rim or flange 2, preferably formed integral with an exterior hoop or band 3 and adapted to support the upper section or member 4 of the trap. The upper section or member consists of a lower cylindrical portion 5 and an upper bell-shaped portion 6, forming a flaring mouth and presenting an inclined surface for directing the animals into the trap. The cylindrical portion, which is preferably constructed of sheet metal, is reinforced at its lower edge by an interiorly-arranged hoop or band 7, which rests upon the inwardly-extending horizontal flange 2 of the receptacle 1. The upper section or member 4 is connected with the receptacle at one side by a hinge 7ª, and it is detachably secured to the other section by a catch 8, consisting of a spring or resilient metallic piece secured at its upper end to the exterior of the cylindrical portion 5 and provided at its lower end with a perforation for engaging a projection 9 of the receptacle. The upper section or member of the trap is adapted to be swung back to permit the contents of the receptacle to be emptied when desired.

The upper downwardly-tapered inverted frusto-conical upper portion or mouth is constructed of sheet metal and wire-gauze. The lower portion 10 is constructed of sheet metal and presents a smooth slippery surface for precipitating animals into the trap. The upper portion 11 is constructed of wire-gauze and adapted to afford a foothold for animals to permit the same to pass downward into the trap; but any other suitable material may be employed and the outer portion of the flaring mouth or entrance may be roughened in any other desired manner. The wire-gauze, however, is preferable, as it permits animals to see the bait. An animal entering the flaring mouth will, on reaching the smooth slippery lower inclined surface of the part 10, be caused to leap into the trap upon a rotary trap-door 12, which will open to permit the animal to fall into the receptacle or lower section of the trap and which will close over the animal with its baited side uppermost.

The rotary trap-door, which is circular, is mounted on a central pivot or pintle-rod 13, which projects from opposite edges of the trap-door to form pivots, and the latter are arranged in suitable openings of the hoop or band 7 of the cylindrical lower portion of the top section of the trap. The rotary trap-door is provided with a centrally-arranged depending weight 14, which is connected with the trap-door by opposite rods 15, but which may be mounted in any desired manner. The depending weight forms a pendulum and is adapted to return the rotary trap-door to its normal horizontal position with the baited side uppermost. The trap-door is provided with a plurality of perforations 16, which are punched from the lower face of the trap-door and which provide a roughened surface over which cheese or other suitable bait may be scraped and which will retain such bait for a considerable period of time; but a piece of cheese or other bait may be tied or otherwise secured to the upper face of the trap-door, as the perforations will permit a string to be readily passed through them for this purpose. The lower cylindrical portion of the upper section or member of the trap is provided with a window 17, preferably consisting of a plate or piece of glass mounted in a suitable frame and located at an opening of the cylindrical portion 5; but any other form of window may be employed. The window permits an animal to see the bait, and to an animal entering the flaring bell-shaped mouth it will present the appearance of an opening, which will induce the animal to enter the trap more readily.

The trap is designed for use in corn-cribs, hen-houses, hay-lofts, in a dwelling, or at any other point, and the receptacle 1 is designed to be buried either in the ground or in the hay, corn, or other substance, so as to expose only the upper portion of the trap, and in order to enable the trap to be employed for catching various animals—such as mink, skunk, rats, and the like—it is provided at the side opposite the window with a substantially rectangular cage 18, extending outward from the lower cylindrical portion 5 and provided with inner and outer hinged doors 19 and 20, designed in practice to have suitable fastening means and adapted to confine a live chicken or other live bait within the cage. The outer door 20 is imperforate, and the inner door 19 is designed to be provided with a lower section or portion 21, of wire-gauze, to expose the bait and to permit the bait to be readily seen by the animals to be captured. Any other suitable means, however, may be employed for exposing the bait at the inner side of the trap. A live chicken or other bait placed in the trap will make a noise and attract animals a greater portion of the night, and an animal attempting to obtain the live bait will be forced to enter the flaring mouth and will be precipitated into the receptacle 1. The inner portion of the cage extends into the flaring or downwardly-tapered mouth or entrance, and the inner door is located wholly within the same. The material of the conical or flaring portion of the upper section is suitably secured to the exterior of the side walls of the cage, as clearly shown in Fig. 1.

It will be seen that the trap is exceedingly simple and inexpensive in construction and it possesses great strength and durability and that it may be readily handled by a child, as there is nothing to catch the fingers or otherwise injure a person. Also it will be clear that the trap is self-setting and that as both live and other bait may be employed the trap may be used for catching a large variety of animals.

Having thus fully described my invention, what I claim as new, and desire to secure by Letters Patent, is—

1. A trap comprising a receptacle, a trap-door, means for holding a bait, and a flaring mouth or entrance presenting an inclined surface for precipitating an animal into the trap, said mouth or entrance consisting of a smooth metallic lower portion, and a wire-gauze upper portion adapted to afford a foothold and expose the bait to view from the exterior of the trap.

2. A trap, comprising a receptacle, an upper section hinged to the receptacle at one side, a catch detachably securing the upper section on the receptacle, said upper section presenting an inclined surface and forming an entrance to the trap, and a trap-door carried by the upper section.

3. A trap, comprising a receptacle, an upper section having a flared upper portion and provided in its lower portion with a window, and a trap-door located at the upper section of the trap.

4. A trap comprising an upper section having a flaring entrance presenting an inclined surface, a cage arranged at one side of the upper section and provided with means for exposing live bait at the interior of the same, a trap-door located below the cage, and a receptacle supporting the upper section and located beneath the trap-door.

5. A trap comprising a tapered upper section, a lower receptacle, a trap-door, and a cage extending through one side of the upper section at a point above the trap-door.

6. A trap comprising a tapered upper section, a lower receptacle, a trap-door, and a cage extending through one side of the upper section at a point above the trap-door and having interiorly and exteriorly arranged portions, the interiorly-arranged portion being provided with means for exposing the contents of the cage.

7. A trap comprising a tapered upper section, a lower receptacle, a trap-door, and a cage extending through one side of the upper section at a point above the trap-door and having interiorly and exteriorly arranged portions, the interiorly-arranged portion being provided with means for exposing the contents of the cage, and the outer portion having a door to afford access to the cage.

8. A trap comprising an upper section carrying a trap-door and adapted to be placed upon a receptacle, and a cage located above the trap-door and extending through one side of the said upper section and having interiorly and exteriorly arranged portions, each provided with a door.

9. A trap comprising a tapered upper portion constructed partially of wire-gauze, a trap-door located beneath the wire-gauze portion, and a cage extending through one of the walls of the trap at the wire-gauze portion and provided within the trap with means for exposing its contents.

In testimony that I claim the foregoing as my own I have hereto affixed my signature in the presence of two witnesses.

WILLIAM H. SHERIDAN.

Witnesses:
   HOMER BEACH,
   OSCAR C. FOWLER.